United States Patent [19]

Lunardi

[11] Patent Number: 4,638,901

[45] Date of Patent: Jan. 27, 1987

[54] STEP OF AN ESCALATOR OR THE LIKE EQUIPPED WITH AT LEAST ONE SAFETY DEVICE

[75] Inventor: Gerhard Lunardi, Vienna, Austria

[73] Assignee: Inventio AG, Hergiswil, Switzerland

[21] Appl. No.: 763,836

[22] Filed: Aug. 8, 1985

[30] Foreign Application Priority Data

Aug. 22, 1984 [CH] Switzerland ........................ 04014/84

[51] Int. Cl.⁴ ................................................ B65G 43/00

[52] U.S. Cl. ...................................... 198/323; 198/333

[58] Field of Search ......................... 198/333, 323, 327

[56] References Cited

U.S. PATENT DOCUMENTS 2,981,397 4/1985 Hansen .

3,986,595 10/1976 Asano et al. ......................... 198/333

4,470,497 9/1984 Kraft ............................... 198/333 X

FOREIGN PATENT DOCUMENTS 1138365 12/1982 Canada .

0087692 9/1983 European Pat. Off. .

1276922 6/1972 United Kingdom .

*Primary Examiner*—Joseph E. Valenza

*Assistant Examiner*—D. Glenn Dayoan

*Attorney, Agent, or Firm*—Werner W. Kleeman

[57] ABSTRACT

In escalators or moving stairways there exists, between the moving step and the fixedly positioned skirt guard, a latent risk of entrapment or catching of the shoe of the passenger, especially when wearing light footwear. The inventive warning devices are arranged at the side uprights or plates of the step of the escalator and induce the user or passenger, by means of a physically and, possibly additionally, by means of an acoustically perceptible signal, to leave the stepped-on danger zone. Each of the warning devices comprising, for example, two swivelingly or pivotably mounted segments is held in a projecting readiness position, through the force of a spring, in relation to the tread surface and the front surface of the step. When the warning device is stepped upon by the passenger, this warning device is pressed into a flush position with respect to the tread surface of the step and in which position a pin, positioned on one of the segments, is pressed against a profiled guide edge of the related skirt guard. The pin thus glides over the profiled guide edge, during the movement of the step, and causes the step to vibrate. Depending upon the shape of the profiling of the guide edge, an additional acoustically perceptible sound or clatter can be generated.

15 Claims, 5 Drawing Figures

STEP OF AN ESCALATOR OR THE LIKE EQUIPPED WITH AT LEAST ONE SAFETY DEVICE

BACKGROUND OF THE INVENTION

The present application relates to a new and improved construction of a step of an escalator or moving stairway or the like, particularly a step equipped with at least one warning device for warning the passenger that he or she has tread on a danger zone of the step.

Generally speaking, the step of the escalator comprises a step body equipped with a tread surface and a front or riser surface. The step further contains two side uprights or plates, each provided with a drag roller or roll and each provided with a fixing device for connection to an endless transport means. A step band or run composed of a number of steps and two endless transport means is guided between two fixed skirt guards.

In escalators or moving stairways there exists, between the moving step and the fixedly arranged skirt guards, a latent risk of entrapment or catching of the passenger's shoe, especially when wearing light or flimsy footwear. Even in escalators of the most different types of construction shoe pinching or catching accidents occur from time to time. During these accidents, fortunately, usually only gymnastic shoes, tennis shoes, rubber or plastic boots are pulled-in between the side uprights or plates of the step and the fixed skirt guards, whereas the foot can mostly still leave the caught footwear. Such accidents usually occur when the passenger places his or her foot laterally so near to the edge of the tread surface of the step that the shoe brushes or wipes against the related fixed skirt guard positioned laterally besides the step.

Apart from the thus ensuing friction opposite to the direction of travel which prevails between the passenger's shoe and the related skirt guard, there also occurs at the escalator transition locations a relative movement with a friction transverse to the direction of escalator travel. Depending on the direction of travel of the escalator, this transverse friction occurs at the upper or lower transition locations where the risers of the steps disappear, i.e. retract, or form, i.e. deploy as the case may be. Through the action of this transverse friction light footwear especially can be pulled-in between the moving step and the fixed skirt guard.

Various inventions have become known to the art by means of which attempts were and are being made to overcome the above-described danger:

Minimizing the distance between the step and the skirt guard by means of special guide devices positioned at the step and centering the step by means of the skirt guard.

Marking of the side and rear parts of the step as danger zones by coloring or inserting different colored edge or margin strips.

Reducing the coefficient of friction by covering the skirt guard with a slide or non-friction layer, e.g. formed of "TEFLON".

Raising the side parts of the tread surface of the step, also by means of inserts, so that these will be avoided because of the uncomfortable foot position.

Fan-type swivelling or pivoting safety or protective walls positioned laterally beside the step and by means of which the relative movement between the step and the skirt guard is screened.

Positioning of safety contacts along the skirt guard, especially at a predetermined distance before the entry of the step into the comb.

A step for escalators with a safety device of this type has become known from the European Pat. No. 0,087,692, published Sept. 7, 1983. Laterally at the steps there are provided two-piece, swivelling apart, fan-type side walls that ar arranged about a common pivot over the drag or trailing roller at the side plate. In the horizontal entrance or exit zone the two side wall parts lie against the step body and conjointly rest next to each other on the axle connecting the step with the transport means. At the transition from the horizontal to the slanting or sloped runway or travel path, at the location where the step risers form or deploy, there first rises or ascends the one side wall part entrained by the neighboring leading step. This, in turn, entrains the second side wall part in a fan-type manner so as to fully cover the triangle towards the skirt guard. This triangle is formed between the tread plate of the one step and the front part of the preceding step in the region of the sloped runway or travel path. The relative movement occurring up to now between the moving step and the fixed skirt guard is thus transformed into a relative movement between the moving step and the side wall moving with the same speed. Thus, while the danger of lateral pinching or entrapment of the shoe is markedly reduced, it is however not rendered totally impossible.

A further construction of step for escalators and equipped with a safety device as mentioned above is disclosed in the German Pat. No. 2,161,442, published July 13, 1972. Here the lateral edge strips and the edge strips of the tread plate directed towards the front part of the neighboring step, are made of colored, differently formed inserts. The lateral insert pieces can additionally rise above or protrude beyond the tread height of the rest of the tread plate. The function of the colored edge strips is to optically indicate to the passenger those parts of the tread plate which should not be stepped upon. Additionally, the possibly raised lateral insert pieces should, when being trod upon by the passenger, result in an uncomfortable foot position and should require him or her to remove his or her foot from this area.

A disadvantage of this prior art construction exists in that when heavy passenger frequency occurs, the colored edge parts will not be noticed or will be completely non-visible and that the lateral raised edge parts of the tread plate, because of structural reasons (greater spatial requirements in the area of the upper and lower turning points covered by the entrance plates) will not be designed with such a height that the passenger will find that standing on them will actually cause an uncomfortable foot position.

SUMMARY OF THE INVENTION:

Therefore with the foregoing in mind, it is a primary object of the present invention to provide a new and improved construction of a step of an escalator or moving stairway which does not exhibit the aforementioned drawbacks and shortcomings of the prior art constructions.

A further important object of the present invention is to devise a step for an escalator or moving stairway by means of which the passenger, upon treading onto the danger zone of the tread plate, is warned by an acoustically and/or physically perceptible signal.

Now in order to implement these and still further objects of the invention, which will become more readily apparent as the description proceeds, the inventive step of the escalator is manifested by the features that through the force of a common spring two segments which are movably arranged at the side upright or plate of the step, between the body of the step and the skirt guard, are pressed apart and held in at least a partially protruding readiness or preparatory position in relation to the tread surface, respectively the front surface of the step. Through the weight or the compressive force of a passenger, these segments are pressed into a substantially flush position with respect to the tread surface, respectively the front surface of the step, to thereby warn the passenger that he or she has entered a danger zone of the step.

One of the more notable advantages achieved by the invention consists essentially in that the passenger, upon entering into or standing on the lateral or side danger zone of the tread surface of the step, or when he or she presses his or her foot into a corner formed by the tread surface or riser of the step, the skirt guard and the front surface or riser of the neighboring step, is warned by the vibration of the step onto which he or she has stepped. Depending upon the construction of the lower edge of the skirt guard and the warning transmission means, e.g. the vibration transmission means, there can be generated, in addition to the vibrations, an acoustic signal generated by rattling.

A further advantage of the invention resides in the fact that the inventive step can be accommodated to the existing spatial area and does not, as in the case of steps with greatly raised side portions, require serious changes within the comb plate area.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Figure 1:
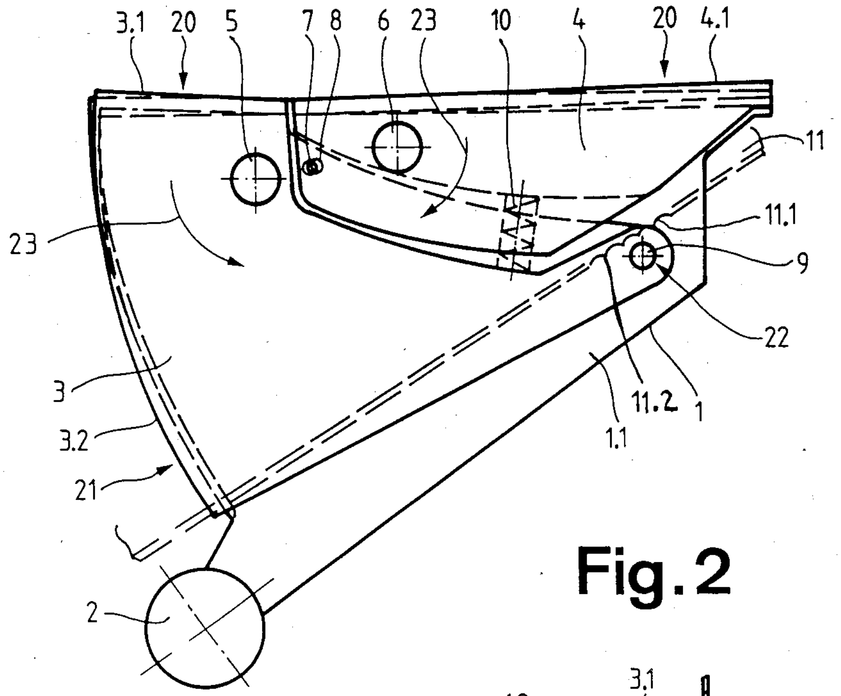
FIG. 1 is a side view of a step with two swiveling or pivotably mounted segments located in a readiness or preparatory position and constructed according to the invention.
Figure 2:
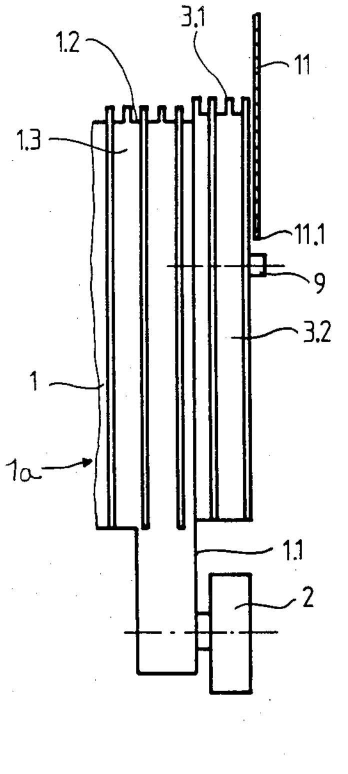
FIG. 2 is a partial front view of the step in accordance with FIG. 1, looking towards the front surface or riser and also depicting a section through a skirt guard arranged laterally next to the step.

Describing now the drawings, it is to be understood that to simplify the showing thereof only enough of the structure of the exemplary embodiments of the step has been illustrated therein as is needed to enable one skilled in the art to readily understand the underlying principles and concepts of this invention. It also should be appreciated that the safety device of the present invention may be and normally would be provided at both ends of the step, and since such safety devices are identical in their construction it will suffice to describe one of them hereinafter in detail. Turning now specifically to FIGS. 1 and 2 of the drawings, the step structure depicted by way of example and not limitation therein will be seen to comprise a step 1 of an escalator or moving stairway. A drag or trailing roller 2 is rotatably mounted on a side upright or plate 1.1 of the step body 1*a* of the step 1 which possesses a grooved tread surface 1.2 and a grooved front surface or riser 1.3. On the same side upright or plate 1.1 there is arranged a pivot pin or pivot 5 for the swiveling or pivotal mounting of a first segment 3 of the step 1 and a pivot pin or pivot 6 for the swiveling or pivotal mounting of a second segment 4 of the step. The first segment 3 of the step 1 possesses a grooved tread surface 3.1 and a grooved front surface or riser 3.2. The second segment 4 of the step 1 possesses a grooved tread surface 4.1.

These two segments 3, 4 of the step 1 are connected with each other by means of a guide pin 7 which is arranged at the first segment 3 of the step 1 and which fits into a guide slot 8 arranged in the second segment 4 of the step 1. These segments 3, 4 are pressed apart into a readiness or preparatory position by means of a common spring 10. A pin or journal 9 provided at the furthest point of the first segment 3 of the step 1 cooperates with a profiled guide edge 11.1 of the related skirt guard 11. The profiled guide edge 11.1 may be constituted by serrations 11.2, as shown in FIG. 1, and against which acts the pin 9 which is fixedly mounted on the segment 3. A loading force or load acting on the tread surface 3.1, 4.1 of the step 1 is indicated by reference character 20, a loading force or load acting on the front surface or riser 3.2 of the step 1 is indicated by reference character 21. A force pressing the pin or pivot journal 9 against the guide edge 11.1 of the skirt guard 11 is indicated by reference character 22. An arrow 23 indicates the direction of the swiveling or pivoting movements of the segments 3, 4 of the step 1 that arise in the presence of at least one of the above-mentioned loads 20, 21.

Figure 3:
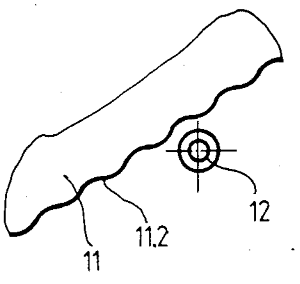
FIG. 3 is a variant exemplary embodiment of the lower edge of the skirt guard.

In FIG. 3 the undersurface or bottom edge of the skirt guard 11 is provided with a wave-shaped or undulated guide edge 11.2. The warning transmission means which engages the wave-shaped guide edge 11.2 is here constituted by a rotatably mounted roller 12

Figure 4:
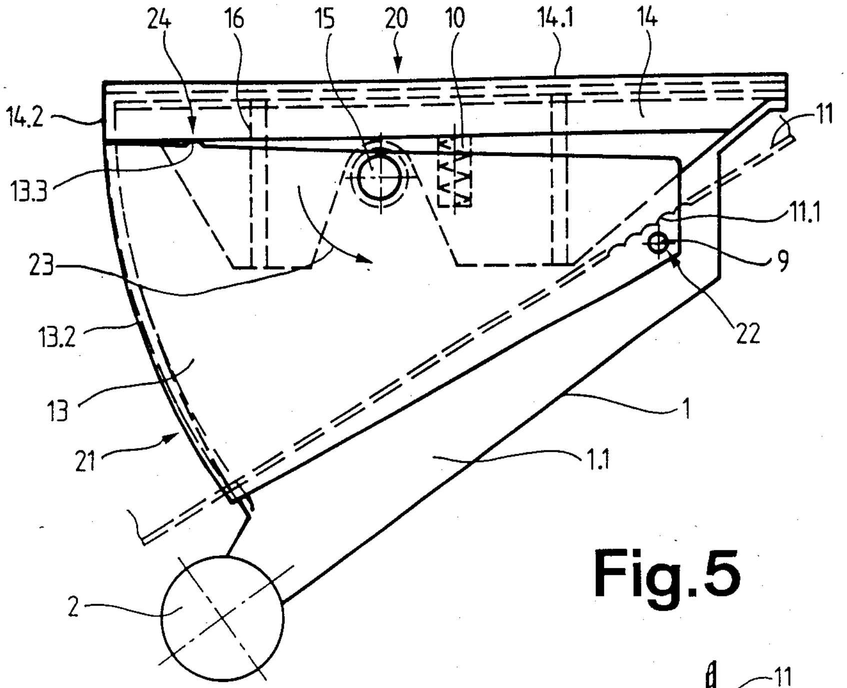
FIG. 4 is a side view of a further exemplary embodiment of a step with a swiveling or pivotably mounted segment and a vertical and parallel guided segment depicted in a readiness or preparatory position.
Figure 5:
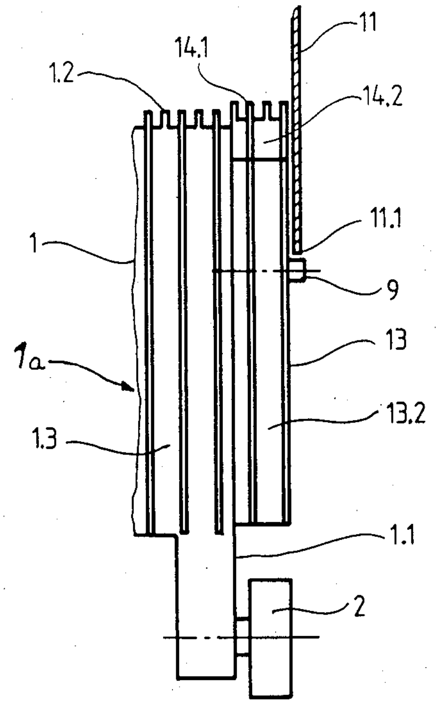
FIG. 5 is a partial front view of the step depicted in FIG. 4, looking towards the front surface or riser and also depicting a section through a skirt guard arranged laterally next to the step.

In FIGS. 4 and 5 the step of the escalator or moving stairway is again indicated by reference character 1. The drag or trailing roller 2 is rotatably mounted on the side upright or plate 1.1 of the step 1. This side upright or plate 1.1 possesses a grooved tread surface 1.2 and a grooved front surface or riser 1.3. At the same side upright or plate 1.1 there is arranged a pin or pivot journal 15 for the swivelling or pivotal mounting of a first segment 13 of the step 1. On the top surface or edge of the first segment 13 of the step 1 there is provided a support point or location 13.3 on which there is supported a substantially parallelly guided second segment 14 of the step 1 in vertically arranged guide slots 16. The first pivotal segment 13 of the step 1 possesses a grooved front surface or riser 13.2, whereas the second substantially parallely guided segment 14 of the step 1 possesses a grooved tread surface 14.1 and a grooved front surface or riser 14.2. The pressure or compression spring 10 common to both of these segments 13, 14 forces these two segments 13, 14 of the step 1 apart and keeps them in an at least partially protruding readiness or preparatory position in relation to the tread surface 1.2 and the front surface or riser 1.3 of the step 1. Whenever there is a flush positioning of the tread surface or front surface of the step 1, the pin or journal 9, positioned at the furthest point of the segment 13 of the step 1, engages with the profiled guide edge 11.1 of the skirt guard 11. The loading force or load acting on the grooved tread surface 14.1 is indicated by reference character 20; the loading force or load acting on the front surface 13.2 is indicated by reference character 21. The force pressing the pin or journal 9 against the profiled guide edge 11.1 of the skirt guard 11 is again indicated by reference character 22. The arrow 23 indicates the direction of the swiveling or pivoting movement of the segments 13 or 14 of the step 1 that arise in the presence of at least one of the effective loads 20, 21.

The above-described safety devices operate as follows: the segments 3, 4, and 13, 14, arranged such that they can be swiveled or displaced, as the case may be, and positioned laterally next to the related side upright or plate 1.1 of the step 1, are held in their unloaded protruding readiness or preparatory position by means of the force of the compression or pressure spring 10 and project at least partially in relation to the tread surface 1.2 and the front surface or riser 1.3 of the step 1. Should the passenger step too near the skirt guard 11 onto the respective grooved tread surface 3.1, 4.1, 14.1 of the segments 3, 4, 14 of the step 1, and/or should he or she press his or her foot into the corner formed by the skirt guard 11, the tread surface 1.2 and the front surface or riser 1.3 of the neighboring step 1, then the segments 3, 4, or 13, 14, as the case may be, of the step 1 are pressed into their aforedescribed flush position. This, in turn, causes, at least the first segment 3 or 13, as the case may be, of the step 1, to carry out a swiveling or pivotal movement in the direction indicated by the arrow 23. As a result, the pin or journal 9 is displaced against the profiled guide edge 11.1 of the skirt guard 11 with a force 22 corresponding to the load force 20, 21.

In the exemplary embodiment shown in FIGS. 1 and 2, the two swiveling or pivotably mounted segments 3, 4 of the step 1 are connected with each other by means of the guide pin 7 engaging the guide slot 8. The turning or pivotal motion in the direction of the arrow 23, caused by the stepping on, or actuation of, at least one of the two segments 3, 4 of the step 1 is thereby always transmitted to the first segment 3 of the step 1 which then is brought into contact with the profiled guide edge 11.1 of the skirt guard 11 by means of the pin or journal 9.

In the exemplary embodiment shown in FIG. 4 and 5 only the first segment 13 of the step 1 is pivotably mounted, whereas the second segment 14 of the step is substantially parallelly and movably guided in the vertically arranged guide slots 16. The support or contact point or location 13.3 positioned on the first segment 13 of the step 1 ensures that also here, upon stepping upon the second segment 14 of the step 1 or upon actuation of the first segment 13 of the step 1, a rotating or turning motion, in the direction of the arrow 23, is induced at the first segment 13 of the step 1. This segment 13 of the step 1 thus is likewise brought into operative association or contact with the profiled guide edge 11.1 of the skirt guard 11 by means of the pin or journal 9. During the movement of the step band or run this pin or journal 9 glides over the profiled guide edge 11.1 of the skirt guard 11 and places or sets the step into vibration. Depending upon the profiling of this guide edge 11.1, there can be generated, in addition to the vibration of the step 1, an acoustical signal due to a clattering action.

Instead of relying upon passenger perception of an optical impression, the escalator passenger is effectively warned by a physically perceptible signal, and possibly additionally, by an acoustic signal, to leave the stepped-on danger area and not to step on it again.

In place of a warning pin or journal 9 fixedly or non-rotatably positioned on the first segment 3, 13 for the transfer of vibrations to the body of the step 1, a rotatably mounted warning roller or roll 12 also could be provided, as previously explained. Also, instead of the compression or pressure spring 10 which keeps the segments 3, 4, and 13, 14 in a readiness or preparatory state, a different type of spring, for instance, a torsion spring, could be used to achieve the same effect.

It is within the teachings and conceptual framework of the invention to augment or replace the purely mechanical warning device by means of a electro-acoustic system.

While there are shown and described present preferred embodiments of the invention, it is to be distinctly understood that the invention is not limited thereto, but may be otherwise variously embodied and practiced within the scope of the following claims.

Accordingly, what I claim is:

1. A step for an escalator, comprising:

a step body including a thread surface and a front surface;

at least one side upright provided for said step body and equipped with a trailing roller;

a stationary skirt guard arranged laterally of said step body in the neighborhood of said at least one side upright;

two segments movably arranged on said step body at the region of said at least one side upright between said step body and said skirt guard;

a common spring provided for said two segments for pressing apart said two segments such that at least one of said two segments assumes a preparatory position at least partially protruding from said step body;

said at least one of said two segments being provided with warning transmission means for engaging a profiled guide edge of a skirt of the escalator in an active warning position of said at least one of said two segments flush with said step body; and said at least one of said two segments being shiftable by a load exerted by a passenger acting upon said at least one protruding segment into said active warning position for warning the passenger that the passenger has stepped onto a danger zone of the step body by vibrations of said warning transmission means engaging the profiled guide edge.

2. The step as defined in claim 1, wherein:

said two segments each assume said preparatory position when acted upon by a load exerted by the passenger stepping onto said danger zone of the step body; and one of said two segments, in said preparatory position, protruding past said tread surface of the step body; and the other one of said two sements, in said preparatory position, protruding past said front surface of said step body.

3. The step as defined in claim 1, wherein:

said at least on segment in said active warning position being substantially flush with said tread surface of said step body.

4. The step as defined in claim 1, wherein:

said two segments each assume said active warning position when acted upon by a load exerted by the passenger stepping onto said danger zone of the step body and said preparatory position when free of said load;

one of said two segments, in said preparatory position, protruding past both said tread surface and said front surface of the step body; and the other one of said two segments, in said preparatory position, protruding past said front surface of said step body.

5. The step as defined in claim 1, wherein:

said tread surface of said step body defines a grooved tread surface; and at least one of said two segments possesses a tread surface defining a grooved tread surface which is essentially the same as said grooved tread surface of said step body.

6. The step as defined in claim 1, wherein:

said tread surface of said step body defines a grooved tread surface; and said two segments each possess a tread surface defining a grooved surface which is essentially the same as said grooved tread surface of said step body.

7. The step as defined in claim 1, wherein:

said front surface of said step body possesses a grooved surface having grooves; and at least one of said segments possesses a front surface defining a grooved surface having grooves which are essentially the same as said grooves of the front surface of said step body.

8. The step as defined in claim 3, further including:

pivot means for pivotably connecting said at least one segment which at least partially protrudes past said thread surface of said step body with said at least one side upright;

the profiled guide edge of the skirt of the escalator being located adjacent said step body and said two segments to cooperate with said at least one segment which at least partially protrudes past said tread surface of said step body;

said at least one segment which at least partially protrudes past said thread surface of said step body being provided with said warning transmission means; and said at least one segment which at least partially protrudes past said thread surface of said step body, when assuming said active warning position, engaging by means of said warning transmission means with said profiled guide edge for generating a warning to the passenger that the passenger has stepped onto said danger zone of said step body.

9. The step as defined in claim 8, wherein:

said profiled guide edge is constituted by a lower edge of said skirt guard.

10. The step as defined in claim 9, wherein:

said lower edge of said skirt guard possesses a substantially wave-shaped guide edge.

11. The step as defined in claim 9, wherein:

said lower edge of said skirt guard possesses a serrated edge.

12. The step defined in claim 9, wherein:

said warning transmission means comprises a fixedly arranged pin member.

13. The step as defined in claim 8, wherein:

said warning transmission means comprises a rotatably mounted roller.

14. The step as defined in claim 8, further including:

means for pivotably mounting the other one of said two segments;

said other one of said two segments being provided with a guide slot; and said at least one segment which at least partially protrudes past said tread surface of said step body possessing a pin which engages with said guide slot of said other one of said segments.

15. The step as defined in claim 1, wherein:

said at least one of said two segments defines a pivotably connected segment;

the other one of said two segments possessing substantially vertically arranged guide slots for guiding the other end of said two segments in a direction in which said other one of said two segments is guided substantially parallel to said step body; and said pivotably connected segment being provided with support means for supporting said other one of said segments.

* * * * *